United States Patent
Ulasyuk et al.

(10) Patent No.: US 8,445,856 B2
(45) Date of Patent: May 21, 2013

(54) MULTI-ELEMENT X-RAY DETECTOR, ITS REAR-EARTH LUMINESCENT MATERIALS, PRODUCTION OF MULTI-ELEMENT SCINTILLATOR AND DETECTOR IN GENERAL

(76) Inventors: Vladimir Nikolaevich Ulasyuk, Fryazino Moskovskaya (RU); Naum Petrovich Soschin, Fryazino Moskovskaya (RU)

( * ) Notice: Subject to any disclaimer, the term of this patent is extended or adjusted under 35 U.S.C. 154(b) by 0 days.

(21) Appl. No.: 13/390,323

(22) PCT Filed: Aug. 13, 2010

(86) PCT No.: PCT/RU2010/000449
§ 371 (c)(1),
(2), (4) Date: Jun. 28, 2012

(87) PCT Pub. No.: WO2011/019303
PCT Pub. Date: Feb. 17, 2011

(65) Prior Publication Data
US 2012/0267538 A1    Oct. 25, 2012

(30) Foreign Application Priority Data
Aug. 13, 2009    (RU) ................................ 2009130870

(51) Int. Cl.
*G01T 1/20*    (2006.01)

(52) U.S. Cl.
USPC ..................................................... 250/370.11

(58) Field of Classification Search
USPC ................ 250/361 R, 362, 366, 367, 370.08, 250/370.09, 370.11, 370.12
See application file for complete search history.

(56) References Cited

U.S. PATENT DOCUMENTS

| | | | |
|---|---|---|---|
| 7,265,357 B2 * | 9/2007 | Pham Gia et al. | 250/370.11 |
| 2006/0033030 A1 * | 2/2006 | Ito et al. | 250/370.11 |

* cited by examiner

*Primary Examiner* — Mark R Gaworecki
(74) *Attorney, Agent, or Firm* — John Alumit (57) ABSTRACT

A multi-element X-ray radiation detector consists of a flat multi-element scintillator in the form of a discrete set of hetero-phase luminescent elements which are arranged in the cells of a mesh made from a metal which absorbs X-ray radiation and reflects light, the increment size of which mesh corresponds to the increment size of the photo receiver matrix. The metallic mesh that forms the multi-element luminescent scintillator is made from elements having an atomic number from N=26 (iron) to N=74 (tungsten), has silver-plated coils, and separates the scintillator elements optically from one another. The process of synthesis is carried out in two stages. Oxyhalides of elements making up a cationic subgroup are formed by reacting an initial coprecipitated oxides of rare earth elements, Bi and Re, with ammonium halides. The resulting product is then subjected to repeated thermal treatment in an alkali chalcogenide melt.

15 Claims, 5 Drawing Sheets

Fig. 1. EFFECTIVENESS OF X-RAY ABSORPTION
OF DIFFERENT CRYSTAL MATRIXES

MULTI-ELEMENT X-RAY DETECTOR, ITS REAR-EARTH LUMINESCENT MATERIALS, PRODUCTION OF MULTI-ELEMENT SCINTILLATOR AND DETECTOR IN GENERAL

CROSS-REFERENCE TO RELATED APPLICATION

This application is a national stage application and claims the benefit of the priority filing date in PCT/RU2010/000449 referenced in WIPO Publication WO/2011/019303. The earliest priority date claimed is Aug. 13, 2009.

FEDERALLY SPONSORED RESEARCH

None

SEQUENCE LISTING OR PROGRAM

None

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

1. Sphere of Invention

This invention relates to X-ray engineering and medical diagnostics which deal with techniques of imaging and visual representation of X-ray radiation in the energy range of 5 keV to 200 keV. In particular, this invention may be useful in medicine for the control and monitoring of pathological changes in a living body. This field of medicine, known as radiology, dates back to the beginning of the XX century when German physicist C. Rontgen discovered penetrating radiation named after him.

This invention can also be practicable for dynamic stream preventive examination of patients where the main task is to reveal major pathologies. The invention may also be used in dentistry which requires X-ray examination of the dentofacial area. Another important role the invention may play is in the field of mammalogy for the examination of mammary glands in women.

In addition to medicine, the invention may be useful in defectoscopy and in non-destructive examination systems in various areas of mechanics, such as weld examination in pipelines. The invention is of particular importance for the quality control of fully armed munitions where the technique is possibly the only way of stream quality control.

The invention may be used in the customs control of dimensional cargo in railroad, air and sea transportation.

Such wide area of possible usage of the invention may be explained partly by the need for non-destructive quality control and diagnostics and is an unusual combination of state-of-art materials comprised of scintillators with matrix-type semi-conductor systems for information reading, computer processing and archiving. Undoubtedly, the invention involves advanced technologies.

2. Current State of Technology

The first X-ray apparatuses were made in the 1920s and comprised an X-ray emitting source and a radiation receiver. Since then, no major changes were implemented in X-ray emitting sources: a vacuum device's high-energy accelerated electron beams bombards a metallic anticathode made of tungsten (W) molybdenum (Mo), or sometimes, of copper (Cu). Emerging impact X-ray radiation is filtered to make it monochromatic and then escapes the device through special materials which are penetrable by radiation type (such as beryllium foil). The resulting X-ray beam has a diameter of several millimeters to ten centimeters. Impenetrable structures or bodies requiring examination are placed into this beam.

For a long time, the only way of visually imaging a change in X-ray quantum density in a beam was by a photoemulsion detector based on silver halides. But due to the relatively low density (2-3 $g/cm^3$) of detecting layers and the low sensitivity of silver halides to X-ray radiation, this method required high exposure to X-ray radiation, thus limiting medical usage.

The first technical solution aimed at significantly lowering the exposure dose for X-ray examined patients were X-ray intensifying screens. These screens allowed for a physical shift of quantum energy. A screen was basically a thin layer of a substance—X-ray luminescent material—which radiated when exposed to X-rays. A screen was usually made in the form of a cassette comprising front and rear screens and a photo-sensitive film. The front screen had a thinner layer of X-ray luminescent material and the rear screen was aimed at stopping X-ray radiation almost completely.

For a long time, the main material of X-ray luminescent materials in the intensifying screens was calcium tungstate ($CaWO_{4}$) which features a high gravitational density and a medium energy conversion efficiency (6.0-8.0%). These parameters were used as a reference for optimal, compounds of X-ray luminescent material. The basic requirements to these compounds were as follows:

average atomic number N in excess of 40 atomic units;
gravitational density in excess of 4.5 $g/cm^3$;
energy efficiency of X-ray luminescent material emission>6%;
back-glow less than $1*10^{-3}$ sec;
spectral maximum of radiation $\lambda > 400$ nm.

Radiology based on direct interaction between X-ray radiation and living tissues (in medical X-ray diagnostics) or between X-ray radiation and parts of complex systems and structures (in X-ray defectoscopy) allowed for the following imaging characteristics in photo-sensitive film or translucent screens:

resolution 1-0.6 mm per pair of lines;
contrast with a ratio between dark or light fields and background below 30%;
imaging of tiny details of 650-800 μm in size;
after-glow period around $1 \cdot 10^{-3}$ sec.

It should be noted that the radiation stress of a patient was excessive even for the state-of-art techniques at the time (1.0 to 10.0 Roentgen units per examination of gastrointestinal tract) [1].

The low characteristics of X-ray diagnostics in 40-70-s necessitated the development of new methods of diagnostics based on other physical principles; thus, in 1964 [2] the first X-ray electron-optical image converting systems (EOIC) were proposed, which managed, the primary conversion (transduction) of X-ray radiation to visible light with further multiple intensification and transformation of the light signal into small picture frame television images [2]. Transducers of the first EOICs were based on halogenide luminescent materials, such as water-soluble cesium iodide, which made the production technology of equipment significantly complex.

At the same time, a method of rapid X-ray photoroentgenography was developed which involved the projection of an image formed on a large translucent luminescent screen onto photographic film by means of a large aperture lens system. This method became convenient for applications where many patients required examination in a short period of time. Photoroentgenography resulted in the discovery of large niduses only.

Beginning in the mid-70-s, the era of rear-earth X-ray luminescent materials began [4], first with primary oxysulfides ($Y_2O_2S$:Tb, $Gd_2O_2S$:Tb), and then with oxybromide (LaOBr). The main achievements and challenges of this period of material and screen development are summarized below [5].

This period of rapid development of materials for radiography brought important scientific results, in particular, the requirements adjustment to the chemical bonding of an X-ray luminescent matrix, as well as the achievement of good experimental results with visual light energy output efficiency under X-ray or gamma-radiation (e.g. 22% for $Y_2O_2S$:Tb which paved the way to a new level of knowledge.

Comparison, in the $La_2O_3$—$La_2O_2S$—LaOBr:Tb row shows a significant impact in covalent-type bonding in luminescent matrices, which previously had mostly ionic bonding. Research results and certain generalizations [6] may be summarized in the following table of optimum parameters for X-ray luminescent materials.

TABLE 1

| Composition | Atomic number, N | Density, g/cm$^3$ | Energy efficiency, % | Wavelength of spectral maximum, nm | Maximum range of radiation hardness keV | Afterglow, ms |
|---|---|---|---|---|---|---|
| $CaWO_4$ | 61.8 | 6.1 | 6-9 | 420 | 80-100 | 1-1.5 |
| ZnCdS:Ag | 38 | 4.8 | 14-18 | 560 | 80-90 | 1-2 |
| CsJ:Tl | 41 | 4.2 | 12-18 | 550 | 80 | 0.001 |
| $Y_2O_2S$:Tb | 36 | 4.95 | 21-22 | 383.478 | 60-70 | 1-3 |
| $Gd_2O_5$:Tb | 59.9 | 6.00 | 20-24 | 545 | 100-120 | 1-3 |
| LaOBr:Tb | 49.3 | 5.7 | 18-20 | 543 | 80-110 | 1-2 |

Most notably, this period of radiology development resulted in a 3-4 time decrease of radiation stress on patients, especially in children. Along with this, a significantly higher ratio of X-ray absorption from new X-ray-sensitive materials results in the rejection of traditionally used X-ray screen coarse-grain materials and the utilization of medium-grain materials which increase the resolution of intensifying screens by 20-40%. This was enough to allow the naked eye to see calcified focuses in the mammas of women. This was the beginning of mammography as a preventive field of practical radiography.

Figure 1:
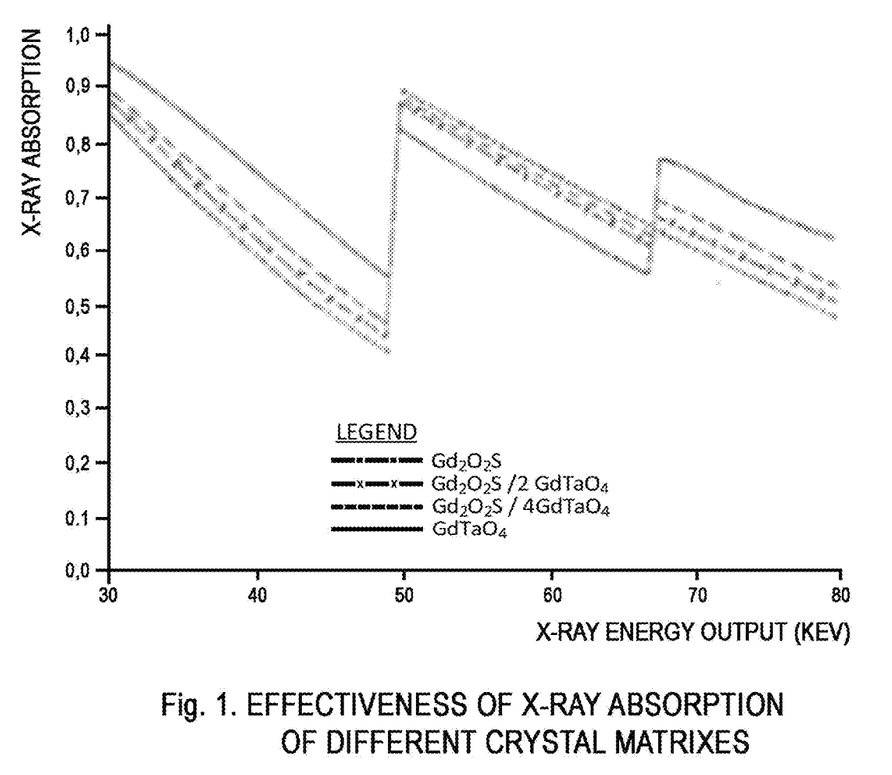
FIG. 1 shows the intensity dependence of X-ray luminescence for various compositions which comprise Gd, O, S, Ta, Lu ions. The energy peaks on the inner K-orbits of the substances' electrons are apparent.
Figure 2:
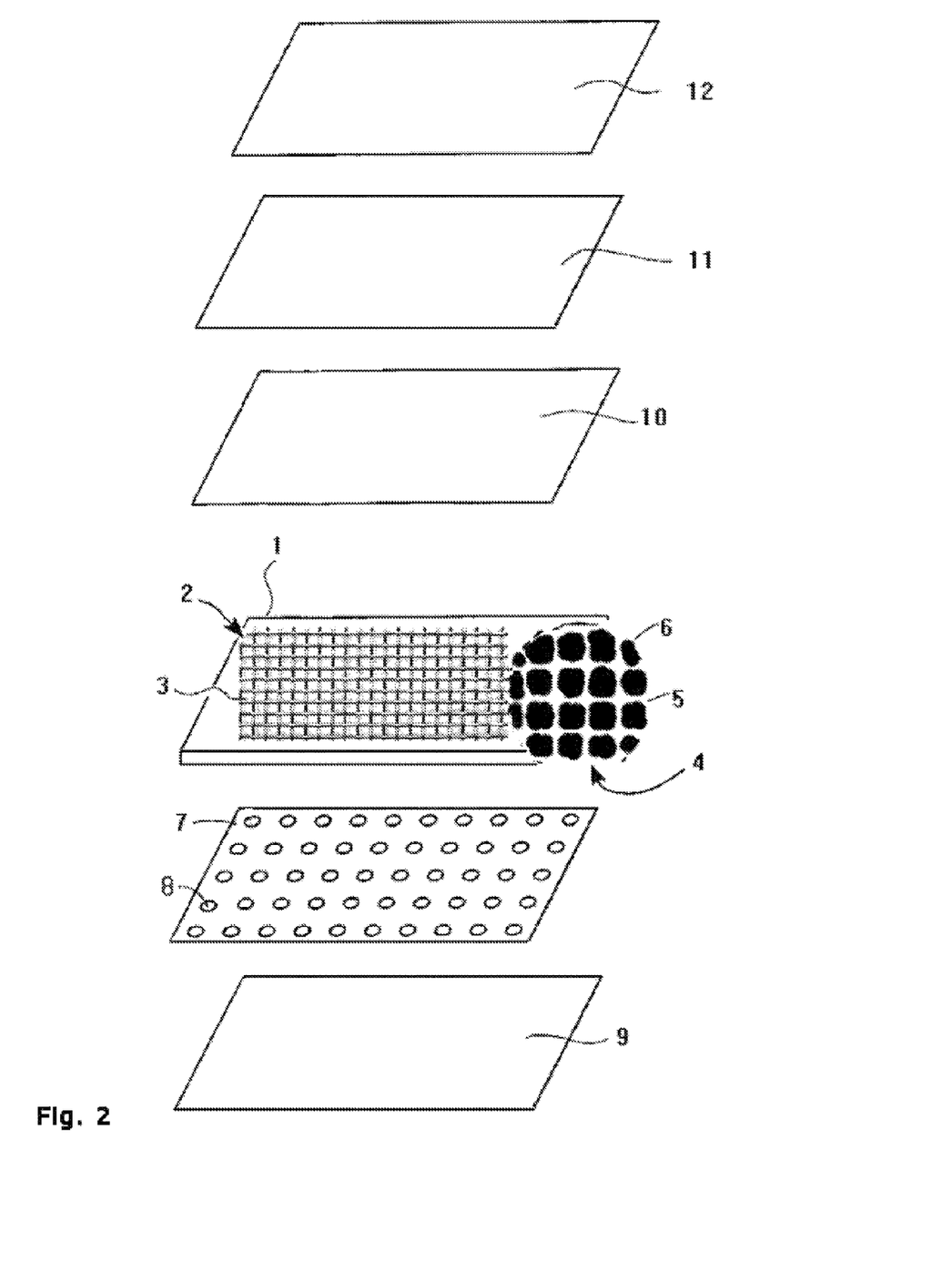
FIG. 2 shows the construction arrangement of the proposed device which shows that the device comprises a multi-element scintillator 1 consisting of an orthogonal metal grid made of interlaced wires 2, and the grid's cells 3 contain hetero-phase elements 4 bearing luminescent glowing materials seen under X-ray radiation (X-ray luminescent material). The inset in FIG. 2 shows the structure of one grid cell. There is a hetero-phase scintillator element 4 in the cell; this element is made of polymer 5 transparent to light with grains of X-ray luminescent material 6 spread all over its surface. The matrix 7 of semiconductor photodiode elements is connected to the inner surface of the scintillator; this matrix bears silicon photodiodes 8 and a system of control electrodes impregnated into the baseplate 9. The external surface of the scintillator has a double-layer reflective coating 10 which is transparent to X-ray radiation and is 0.6 mm thick. The cover glass 12 is used as a bearing structure which fixes all operational layers of the detector with polymer coating 11.

At the same time, PHILLIPS proposed using new column X-ray-sensitive coatings (CsJ:Tl) in the screens of EOICs, which had the advantage of not dispersing light due to the light-conducting properties of column microcrystalls of the cesium iodide. The image quality of these apparatuses was as high as in succeeding serial apparatuses which had screens with gadolinium oxysulfide. EOICs allowed for the observation of interaction between soft tissues with X-ray contrast substances, such as barium sulfate or tantalic gadolinium ($GdTaO_4$) (FIG. 1) to reveal ulcerous focuses or other pathologies in a patient's body. The brightness of screens in X-ray devices was improved and reached a threshold of direct registration (brightness level 2-3 cd/m$^2$) by means of an optical image transfer and/or intensifier also based on CCD-matrix [6].

At the same time, it allowed for a decrease in, the energy limit of registration for soft X-ray radiation featuring an energy of E=100-1000 eV. This technology was later used in deep-space apparatuses [6].

The production of highly sensible CCD-matrixes with $10^{-2}$ lux of light threshold started the development of advanced digital X-ray-sensitive devices [7] which form images with a brief delay during patient examination.

This new stage of real-time radiography development lasts until today. This stage involves:

improvement of dispersiveness of the most effective material based on $Gd_2O_2S$:Tb [8];

selection of compositions based on this luminescent material [9];

creation of X-ray microdetectors [10];

improvement of silicon matrices [11];

creation of the first types of digital X-ray detectors [12];

digital X-ray detector [13];

utilization of white reflecting coatings based on $Ta_2O_5$ in [14];

utilization of optically transparent ceramics based on $Lu_2O_3$Eu in the new detector [15].

The most recent publication on this topic is an article by Korean scientists [16] who proposed the construction and production technology of a multi-element X-ray sensitive layer of $Gd_2O_2S$:Tb in polyethylene press-work having elements coated with reflecting film made of Cr—Al (6000 Å thick). The authors noted a 1.5-2 time decrease in the X-ray luminescent material radiation compared to the solid layer of luminescent material. Yet, the modulation transfer function in the image formed on the structured X-ray sensitive screen is somewhat higher with several extrema of the frequencies close to the geometrical dimensions of screen elements.

Despite some advantages in the detector described in [16] such as a decrease in overall X-ray radiation which falls into a pixelled (multi-element) scintillator only, this construction has several major disadvantages:

reduction of radiation intensity of multi-element screens made of $Gd_2O_2S$:Tb;

shallow thickness of X-ray luminescent material allowing for X-ray radiation to reach photodiodes directly causing their degradation;

complex production of microscopic multi-element detectors due to the utilization of the photolithographic process; thus, the original article cites only a small sample of the screen 2 by 3 cm in size;

low contrast of the image on a scintillator; to enlarge the image, the scintillator is additionally covered with a blackening graphite grid;

the shallow thickness of $Gd_2O_2S$:Tb luminescent material allows for the use of low accelerating voltages in the X-ray tube only, e.g. 45 keV, which is suitable for limited application only, for example, in dentofacial examination.

These disadvantages were considered in the publication [17] which we used as a prototype for our invention in which the authors suggest a return to radiation sources made of CsJ:Tl with columns of 4-7 μm thick. Elements up to 16 mm high comprised of such structures were used to create a complete scintillator. The authors claimed that such a detector had a modulation transfer function MTF=40% at a resolution of 4 pairs of lines per mm and a MTF=10-20% at a resolution of up to 8 pairs of lines per mm along with an image contrast decrease.

Despite some advantages presented by high quantum detectivity DQL=0.28, the authors suggested that use of CsJ:Tl is not necessarily effective due to defects in microcrystals. With all this, as the authors insist, the intensification of patient radiation stress may be only partly justified by the high definition of the detector.

Despite the various advantages of the prototype detector, such as high quantum detectivity which is singularly prominent at low energies, the prototype had many significant deficiencies. First of all, it has a narrow range of exciting energy of X-ray radiation from 35 keV to 60 keV which is insufficient for a complete medical examination. The second issue is that the radiation load may reach high values of ten roentgens, especially if complex pathologies are to be examined, or if X-ray contrast substance is used. Third, due to the small size of each of the structural elements of the detector (16 mm), the resulting image would be fogged because of the discontinuity of each element.

Fourth, the hidrophylic behavior and temperature-sensitive character of cesium iodide CsJ:Tl requires a comprehensive sealing of detector elements and protection from moisture, which poses a complex problem in view of the elements' tiny size.

Fifth, it should be noted that the production of column structures of CsJ along with interaction with extremely toxic thallium Tl is a very complex and environmentally-prone problem that may be solved by the use of advanced-technology rooms with closed-circuit atmosphere and induced air.

Thus, the series of disadvantages of the existing X-ray detector design, such as the narrow energy operating range, the discontinuity of the imaging field, the low hydrolytic stability and the durability, creates a need for the proposed X-ray detector.

OBJECT OF INVENTION

The main object of the invention is to create a multi-element X-ray detector featuring a high contrast of integral images and information reading by means of a matrix system of silicone photodiodes. Another object of the invention is to create a wide range of X-ray energy devices capable of operating under various voltages in an X-ray emitter (tube). One of the main objects of the invention is to create a set of multi-element detectors with different resolutions but with equal contrast and contrast transfer parameters.

A very important challenge in developing the invention is the evolution of a single process cycle of production for the multi-element detector independent of its geometrical dimensions.

Another challenge in developing the invention is to explore the possibility of manufacturing a universal multi-element detector for several types of penetrating radiation, such as low-energy X-ray radiation (below 10-15 keV), gamma-radiation (energy value 150-250 keV) and slow neutron beams (energy value E=0.1 eV to 1-2 eV).

SUMMARY

To reach the above-mentioned objectives and challenges we suggest a novel construction of a matrix X-ray detector which consists of a flat multi-element scintillator necessary to transform X-ray radiation reaching the external surface of the scintillator into visual light, and a photodetector matrix which transforms the luminescent radiation of the inner surface of the scintillator into an electrical signal. This detector differs from others with a luminiscent scintillator construction, in that it is made as a discrete set of hetero-phase luminescent elements arranged in cells of a grid made of X-ray-absorbing and visual light reflecting metal. The spacing, cross-section and interconnection dimensions of the aforesaid grid are equal with the dimensions of each particular luminescent element and coincide with the actions of the photodetector matrix, while the rear surface of the grid has a reflecting layer and the front surface is covered with a multi-element photosensitive semiconductor matrix. Each element of this semiconductor matrix is optically in contact with elements of the luminescent detector, and they are simultaneously excited by the X-ray radiation in the energy range of 30 to 140 keV.

DETAILED DESCRIPTION

We shall now further briefly describe the physical features of the proposed matrix detector, which is based upon a metal grid filled with X-ray luminescent material. As we have established in prior optical testing, the metal grid divides the solid layer of luminescent material into a mosaic multi-element pattern and significantly increases the contrast of detector imaging (1.5-2 times).

The stated difference is achieved by an X-ray detector with an X-ray-sensitive layer having a mosaic pattern shaped in an

X-ray luminescent material layer by a grid made of metal having atomic numbers 24 to 74.

Let us consider the physical processes of the device. A full-wide beam of X-ray radiation reaches its front surface. This beam is emitted by a vacuum X-ray tube with an alternating anode voltage U=60 keV to 125 keV and a working anticathode made of Mo. X-ray radiation emitted as a result of electron beam deceleration escapes the tube through a vacuum-tight window shielded with beryllium foil. High-energy X-ray radiation penetrates a reflecting layer of the detector's surface and reaches the X-ray luminescent material grains.

This original X-ray radiation causes primary K-electrons in the luminescent material grains and then collective energy oscillation—plasmons which further disintegrate into electron-hole pairs (e+p) to directly interact with ions of activators and sensitizers of the X-ray luminescent material grain. The distance which the primary X-ray quantum travels in the scintillating target is 20 to 200 μm depending on the initial energy $E_{x-ray}$ and density of the X-ray luminescent material used. It is known that luminescent material made of $Gd_2O_2S$:Tb with density of ρ=6.6 g/cm³ (the quantum with energy E=60 keV) penetrates to the depth $\epsilon$=0.1p×$d_{av}$=0.1×6.6×10=40 mg/cm². If the initial energy of a quantum is E=120 keV, then the penetration depth is 160 mg/cm².

As we will show later, the technical solution is a reduction of the fully required penetration depth of up to 100 mg/cm³ for the working values of X-ray quantum energy.

Excited active ions (activator) in the bulk of the X-ray luminescent material usually gets ionized under the effect of the electron-hole pair i.e. changes its oxidation degree. Thus, active ion $Eu^{+3}$ absorbs an electron:

$$Eu^{+3}+e \rightarrow Eu^{+2*}+p \rightarrow Eu^{+3*} \rightarrow Eu^{+3}(5D_j,7FJ)$$

with emissions of red quantum with wavelength λ=626 nm to λ=710 nm. The possible number of quanta emitted by the X-ray luminescent material is N=Ep/ħωpr, where Ep-initial is the energy of a quantum, ħωpr-energy of plasmon.

As we have shown before, a more exact quantity of quanta allows for the value of a linear-cluster plasmon ħωpl and not for the value of a bulk plasmon ħωpr. According to our adjustment, the more the atomic mass of the elements of a cluster, the less energy is required to excite such cluster. Thus, the X-ray luminescent material $Gd_2O_2S$:Tb is the value ħωpr=16-20 eV, while in the proposed material $(Gd,Lu)_2O(Br,N)S$, the value of a linear cluster decreases down to ħωpl=14.8 eV, indicating a significant increase in effectiveness of the novel luminescent materials proposed in the patent claim.

A quantum of visual light generated in the X-ray luminescent material has an energy value hv=2.1 eV to hv=1.85 eV. Each X-ray luminophore emits a quantum uniformly, filling 4π space. To increase the degree of light channeled to the photosensitive elements of the detector, the invention assumes coating the external surface of the detector with reflecting Al film 0.1 to 0.6 mm thick, which enhances the glowing brightness of the detector elements by 40-0.60%

The aforesaid advantage is realized in a multi-element detector which features a rear side coated with a double-layer reflecting metal film 2000 Å to 6000 Å thick, with a detector covered with metal silver up to 1000 Å thick with an overlaying aluminum coating up to 5000 Å.

As we revealed during the development of the invention, the albedo of the proposed double-layer film is 88-92% against 82% of a single-layer Al coating which is conveniently used in electron tube devices.

Moreover, to enhance light concentration in the detector, we propose coating wires, which are the base of the detector grid structure, with Al (vacuum process) or Ag (electrodeposition or vacuum process). As we have practically proved, this produces up to 10-15% of light in excess compared to the unstructured layer of a photodetector.

This advantage is realized in the proposed design of a detector with grid turns coated with a reflecting metal layer of silver up to 2000 Å thick formed by electrodeposition or under vacuum deposition process.

Characteristics of Grids Used in the X-Ray Detectors.

Furthermore, we provide the basic parameters of the metal grid. First, a grid is a structure element made of intercontacting metal wires located perpendicular to each other. Through the manufacturing process, the grids may be woven, which are produced in a weaving loom; thus having basic wire and weft perpendicular to it. A grid is designated by number which shows the quantity of base wires per 1 centimeter of the grid. Along with this value, the rated diameter of the wire used is usually expressed in millimeter fractions. Another important parameter of a grid is the grid size "in the light," i.e. the linear space which is not filled with the wire turns. If the area of such space is considered, then this parameter is called "live cross-section in %".

As an example, let us examine parameters of a woven grid N20. This grid utilizes one base wire and one weft wire with an equally rated diameter 0.10 mm. The grid size in the light for this wire is 0.400 mm in the base. The "live cross-section" of a square cell is estimated as 64%, which means that this grid lets 64 percent of light or penetrating radiation pass and fall on its surface.

It should be noted that such a high value of the "live cross-section" is an extremely important feature of the proposed design for a multi-element detector. Basically, the "live cross-section" values of the metal grids are around 25% to 50%. In rare occasions, for example, in a grid N1 made of 1 mm wire, such grid has a cell size in light of 9 mm and a "live cross-section" of 81.90%. But as explained below, such coarse grids are difficult to utilize in the proposed invention due to the deterioration of the detector's resolution ability.

A grid is usually delivered in reels, rolled in a cylinder. After the reel is unwound, the grid is to be mechanically flattened and the required pieces are cut out. The type of X-ray control for which the detector is intended determines the properties of these pieces. In our tests, we picked out grid sheets with 64*64 elements, 128*128 elements, 256*256 elements, 512*512 elements and 1024*1024 elements in the light. Accordingly, the linear dimensions of the elements with N20 grid were 25.6*25.6 millimeters, with an area of live cross-section of S=25.6*25.6*0.64=419.43 mm². The cell dimensions and the "live cross-section" areas for the rest of the testing elements may be calculated similarly.

In the course of developing the invention, we determined that the main criteria of the utilized grid parameter improvements are the following two:

the maximum area of the live cross-section, expressed in percents;

the optimum number of base lines per 1 running mm of the grid length.

If these parameters are in place, the resolution ability of the detector may reach above 3 pair of lines per millimeter.

This is another significant advantage of the proposed detector with a detector's X-ray sensitive layer having a cellular multi-element structure based on a woven, coiled or electrodeposited grid with a "live cross-section" area above 48%, typically above 61%, and the number of wires per length unit of base above 3 per millimeter.

A review of industrial catalogues of metal grids showed; that the maximum area of a "live cross-section" is 60-64% with 2 to 4 wires per mm. During the invention's development, we proposed a metering circuit for determining the information and brightness parameters of the multi-elemental detector. This circuit comprised an X-ray source, test-objects (sheets of metal grid made of different diameter wires), and elements of the detector coated with luminescent material. The X-ray radiation energy used in the test was 45 keV. The quantitative characteristics were arranged in a selection matrix which included the measurement results of the glowing brightness of a scintillator's inner surface and the linear size of the black-to-white border in the image.

The following relationships were determined for the proposed scintillator:

if the wire's diameters are equal, then the glowing brightness is proportional to the "live cross-section" of the metal wire;

if the wire's diameters are equal, the brightness intensity decreases proportionally to the number of metal grid turns per 1 millimeter;

an increase in the number of metal grid turns results in an increase in intensity of background light noises in the working field of the detector.

Thus, we suggested the following types of metal grids should be used in a multi-element detector:

woven grids made of various metals, starting with stainless steel, yet with the main element of alloy is iron Fe with an atomic number 24 and then brass, bronze or tombac alloys based upon copper with an atomic number 29;

electrodeposited grids with the main element of material nickel Ni with an atomic number 28;

coiled grids made of extremely thin tungsten wire; the main element is tungsten with an atomic number 74.

Mechanical and optical properties of the grids are presented in the Table 2 below.

TABLE 2

| Grid Type | Material | Atomic Number | Grid Size (turns per mm) | 'Live cross-section', % | Hardness, % |
|---|---|---|---|---|---|
| Woven | Stainl. steel | 26 | 2-4 | Up to 64% | 100 |
|  | Bronze | 29 |  |  |  |
| Electrodeposited | Nickel | 28 | 20-40 | Up to 80% | 50 |
| Coiled | Tungsten | 74 | 40-60 | Up to 85% | 200 |

As we revealed in developing the invention, any of the metallic grid sheets results in improving imaging contrast 1.5-2 times, while coiled tungsten grids enhance this parameter 2.5-3 times.

The stated advantages of significantly enhancing imaging contrast are realized in a detector featuring woven metallic grid sheets made of stainless steel, nickel or bronze with a "live cross-section" of up to 64%, as well as coiled tungsten grids with a "live cross-section" of up to 85%.

X-Ray Sensitive Luminescent Materials for the Detector.

Single-phase luminescent coatings such as column screens made of CsJ:Tl under vacuum technology are usually used in the cited literature detectors. This technology implies thermal evaporation of process material such as cesium salt CsJ doped with 5% of thallium Tl on a substrate. In this case, luminous transmission, which is the preferred distribution of visual light, provides significantly different refraction indices of cesium iodide (n≈2) and medium—typically, atmosphere air (n≈1). Such double difference of refraction indices allows for luminous transmission in elements as little as 40-50 µm. The only drawback of such column structure is the appearance of gas bubbles and microscopic inclusions during coating.

We propose another structure of a detector which provides for no optical interaction between its X-ray-sensitive layer elements by means of placing each of the laywer elements into a casing composed of metal grid coils. In this case, we propose filling the space between the luminescent grains with a polymer transparent to light; this space amounts to up to 60% of the total volume of the detector. As we discovered, the hetero-phase nature of the layers ensures the minimum influence of the luminous transmission, which is a consequence of the difference in refraction indices of the X-ray luminescent grains and the polymer binder. We have also shown that the ratio between the refraction indices of luminescent material and the proposed X-ray-sensitive detector's polymer must be within the range of $1.2 < n_{luminescent}/n_{polymer} \leq 1.6$.

If the refraction index of the proposed luminescent material's grains (composed of gadolinium-lutetium-europium) is n=2.2, then the upper limit of this inequality is determined by the optical properties of the polymers used, which typically have low refraction indices. Thus, methylmethacrylate has a refraction index n=1.45. Well-known organosilicon polymers have n=1.45-1.55. Optical epoxy polymers have n=1.56. We suggest using an X-ray-resistant polycarbonate in the invention with a refraction index n=1.59-1.60 and optical transparency of, about 91-92% in the visual spectrum. In this case, the light propagation in the hetero-phase medium comprised of polycarbonate polymer and X-ray luminescent material increases 2.3 times or, if luminescent material is taken in optimum concentration, 2.8 times.

This significant advantage of the X-ray sensitive layer is realized in a detector featuring a disperse medium composed of a polycarbonate with a refraction index n=1.59-1.60, which encapsulates a disperse medium of rear-earth X-ray luminescent material with a refraction index n=2.2.

As we have also discovered in our work, an increase in the polymer volume concentration of the detector's hetero-phase material results in additional luminous transmission or luminescent material radiation channeling, while an excessive increase in the volume concentration of the polymer in the hetero-phase medium above 75-80% has an adverse effect. This is the result of a decrease in the detector element's X-ray radiation intensity along with an increase in the volume concentration of polymer in the hetero-phase detector. Table 3 shows data on the dependence between the detector's radiation intensity and the volume concentration of translucent polymer, which implies that the optimum concentration for producing an X-ray sensitive layer is the ratio of 2- to 60%

TABLE 3

| Detector Characteristics | Polymer Volume Concentration, % | | | | | | | |
|---|---|---|---|---|---|---|---|---|
|  | 10 | 20 | 30 | 40 | 50 | 60 | 70 | 80 |
| Radiation Intensity % | 200 | 180 | 160 | 140 | 120 | 100 | 80 | 60 |
| Possible Optical Distance, mm | 40 | 60 | 80 | 100 | 120 | 140 | 160 | 200 |

Manufacturing Process of the Detecting Layer.

There are several manufacturing processes of multi-element X-ray detector production in the cited literature.

First, it's extrusion, method implies the preparation of superconcentrates from a mixture of high-density polyethylene (HDP) and luminescent material grains. These superconcentrates contain up to 20% mass of luminescent material. Then, these granules are extruded into a thin polyethylene film in a single-worm extruder. Then, this film is molded under a temperature of T=130-160° C. onto the comb structures of the detector, forming cavities required to provide a discrete layer nature.

Regardless of industrial practice of this procedure, it has significant deficiencies. Double heating of the luminescent material in the molten polyethylene is attributed to this procedure, which results in surface oxidation of the X-ray luminescent material forming an oxysulfate film of $Gd_2O_2SO_4$. This causes non-radiating recombinations and a decrease in effectiveness of the X-ray radiation's transformation to light. To eliminate this deficiency of a widely-used process, we developed a cast process of detector formation. The following are the main features of the cast process:

use of a specially composed suspension made of a molecular dispersion of polycarbonate and luminescent material grains;

utilization of separation die hole for the starved feeding of the luminescent material suspension applied onto the grid of the detector;

utilization of a moving continuous belt with a prefixed grid sheet;

a hetero-phase polymer layer drying in infrared light which fully penetrates the layer.

The resulting detecting layer features precision thickness e.g. 40 to 120 μm.

A significant advantage is realized in the X-ray-sensitive coating of a detector featuring cast process production, which implies the distribution of a liquid-phase X-ray luminescent material suspension through a solution of polymer binder where the polymer is a polycarbonate with a molecular mass of M=10000-15000 carbon units dissolved in a low-boiling solvent, such as methylenechloride containing a powder X-ray luminescent material in suspension of about 20 to 40% of polymer mass.

We suggest using a special X-ray-stable polycarbonate as a polymer binder. This polycarbonate contains functional groups (C—O—C—O) with a polymerization number of n=150-250 and, a molecular mass M=10000-15000 carbon units. Grains of this polymer are dissolved in an organic chloride-containing solvent of methylenechloride type $CH_2Cl_2$ featuring a boiling point of $T_{biol}$=40.1° C. The primary suspension used for cast is prepared in a special mixer in a ratio 1:1 (methylenechloride to polycarbonate) resulting in a solution with a required viscosity of 10 to 25 centipoise. Further, a powder luminescent material is added to the solution amounting to up to 20 to 65% by mass of initial polycarbonate used.

Thus, to produce test casts we used 50 grams of pelletized polycarbonate, 50 grams of $CH_2Cl_2$ and 20 grams of luminescent material grains. The suspension had a viscosity of 18-20 centipoise and was poured into a taper die made of stainless steel. The die volume was 150 cm³. The die was able to apply suspension to the grid sheet at the required rate controlled by microscrews. The applied layer of thickness was determined by the rate of application suspension and the speed of a moving continuous belt carrying a metal grid sheet. We determined that in a single trip of the moving belt, it was possible to make a cast coating of 20% μm (approximately 20% of the diameter of the grid wire used) to 100 μm. If a thicker coating was required, the process had to be performed twice. Before the second application, the primary coating was polymerized under the temperature of T=110-120° C. for 30 minutes.

An important feature of the suggested cast method of luminescent coating formation directly in the grid sheet bulk is a preservation of the flexibility of the overall detector structure comprised of the grid sheet with the detector's X-ray-sensitive elements inside each grid cell.

Figure 3:
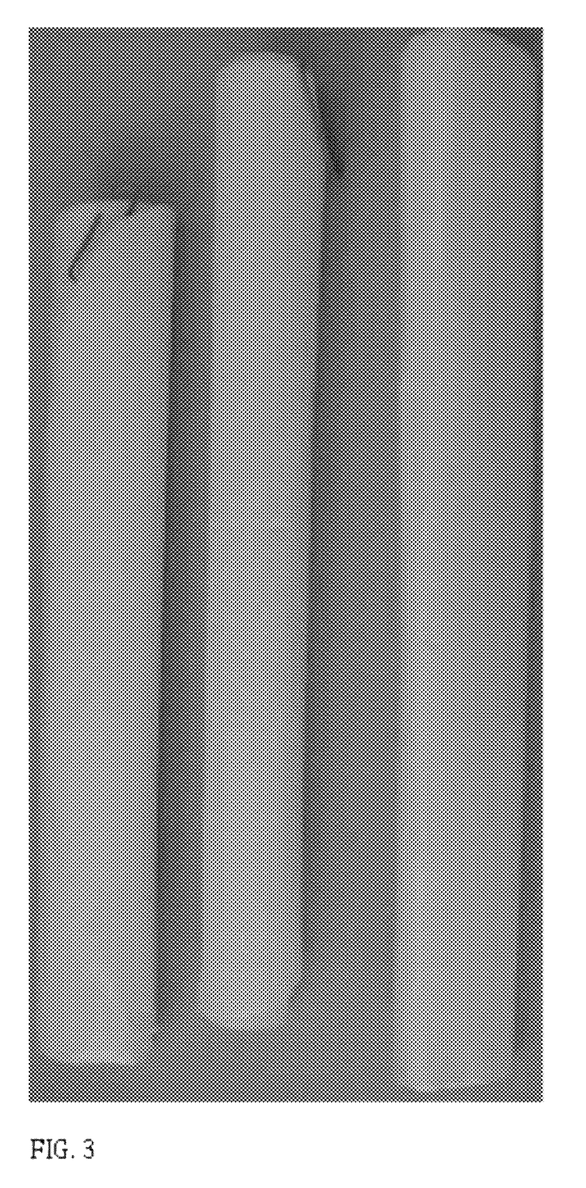
FIG. 3 shows cast film coatings for the X-ray scintillator.

FIG. 3 shows different test elements of the detector elements. We succeeded in producing detecting layers on the grid sheets made of 100 μm wire, 120 μm wire and 150 to 200 μm wire.

The thickness of the luminescent multi-element coating of the grid sheet varied from δ=40 μm to δ=120 μm.

The full load of luminescent material in the detecting layer in this case varied from m=20 mg/cm² to m=80 mg/cm², which is enough for absorption of the X-ray radiation of E=20 keV to E=85-90 keV. The multi-element detecting layer amounted to 80% of the grid sheet thickness (full filling) to 30% of the full thickness, and the inner surface had cavities while the external surface adjacent to the layer of silicon photodiodes remained virtually smooth without any grooving.

Novel Composition of the X-Ray Luminescent Material for the Detector.

Another field of the developed invention was the creation of a novel composition of X-ray luminescent material for the detector. According to the data on K-jumps on the inner orbitals of atoms provided in FIG. 1, the material must contain a substance with electrons on the inner K-orbits featuring a binding energy of $E_K$=40 keV to $E_K$=70 keV. For this reason, we tried to use as a matrix (substrate) of luminescent material elements such as gadolinium Gd with a K-jump energy of E=56 keV and lutetium. Lu with a K-jump energy of E=61 keV. Elements europium Eu with a K-jump energy of E=54 keV and samarium with a K-enegy of E=57 keV occupy the medium position. As the supplementary absorbing element, we suggest including into the luminescent matrix element bismuth Bi with an atomic number N=83, which features a high gravitational density of ρ=8.9 g/cm³ if presented as an oxide, allowing for an enhancement of the energy parameters under a high electron beam energy of E=120 keV. As an energy modifier of the luminescent material, we assume the addition of small quantities of rhenium oxides $Re_2O_7$ with a density of ρ=8.2 g/cm³.

Oxygen 0 with an energy of K-jump of E=12 keV is proposed as the base ion of the anionic sublattice. As we have shown in our work, ions of fluorine, chlorine, bromine Br (N=35, K-jump energy=37 keV) and iodine I (N=53, K-jump energy=46 keV) may also be used as energy modifiers (additives promoting energy efficiency).

Thus, we propose the following composition of X-ray-sensitive luminescent material in the range of oxides $Gd_2O_3$, $Lu_2O_3$, $Eu_2O_3$, $Dy_2O_3$, $Bi_2O_3$, $Re_2O_7$ for the cationic sublattice and of ions in the range $O^{-2}$, $S^{-2}$, $Se^{-2}$, F, Cl, $Br^{-1}$, $J^{-1}$ for the anionic sublattice.

The most allied in the proposed composition of crystal-chemical properties are monoligand oxysulfide selenides with additionally the inserted ion-ligands of $F^{-1}$, $Cl^{-1}$, $Br^{-1}$, $J^{-1}$, $N^{-3}$ group. The proposed composition of X-ray luminescent material provides energy efficiency of up to 24% (absolute) in the case of the initial energy of the X-ray beam 80 keV, while the thickness of the layer is reduced. Because the radiation spectrum of the proposed luminescent material is mainly in the red area of the visual spectrum and optimally correlates with the silicon photodetector's sensitivity, the latter generates 1.8-2 times the intensity of the current signal.

This significant advantage is realized in a detector based on an X-ray luminescent material featuring the following stoichiometric formula where $\Sigma Me$=Gd and/or Lu and/or Eu and/or Dy and/or Bi and/or Re $\Sigma Hal$=$F^{-1}$ and/or $Cl^{-1}$ and/or $Br^{-1}$ and/or $J^{-1}$, while stoichiometric indices are within the range:
$0.001 < x \leq 50.08$, $0.001 \leq y \leq 0.01$.

The average value of the atomic number of the proposed X-ray luminescent material comprised of gadolinium (up to 50% atomic units), lutetium (up to 42 atomic units), europium (up to 6% atomic units) and a mixture of dysprosium, bismuth and rhenium (up to 2% atomic units) is N=69 units with an experimentally determined effective density value of $\rho$=8.3-8.5 $g/cm^3$.

X-Ray Luminescent Material Processing.

If a material comprises more than 10 elements, then a technology for the production of this material must be proposed eliminating the possibility of inhomogeneity of the product in terms of the elements' concentration, while providing for a scheduled synthesis of the compound subject to any requirements of the chemical strength and stability.

It should be noted that the luminescent materials in a similarly claimed invention proposes processing either mainly by vacuum evaporation of the column whisker crystals of CsJ:Tl type or by chemical one-stage molt processing of gadolinium oxysulfide $Gd_2O_2S$:Tb.

As the closest counterpart, we suggest molt processing of the proposed X-ray luminescent material composed of rear-earth ions and d-shell ions (Bi, Re, $Br^{-1}$ and $J^{-1}$), in a two-stage process synthesis. The first stage generates oxyhalides of the cationic group elements by means of interacting initially codeposited oxides of rear-earth elements, Bi and Re with ammonium halides under the temperature of T=400° C. to T=700° C. for 1-4 hours with subsequent secondary heat treatment in the alkali chalcogenides with a molecular ratio of 1:1 or 1:3 under the temperature of T=800° C. to T=1200° C. for 0.2 to 8 hours, with subsequent leaching of the final product with water and mineral acids solutions.

Thus, the main feature of the proposed generation of rear-earth X-ray luminescent material is of a chronological and temperature multi-stage nature along with use of various chemical reagents at each stage of the integrated process.

Several possible compositions of the X-ray luminescent material proposed in the patent claim are shown in the Table 4.

$H_2O$ and active gases. Furthermore, this zinc silicate film provides good flowability and prevents agglomeration of the luminescent material grains.

Figure 4:
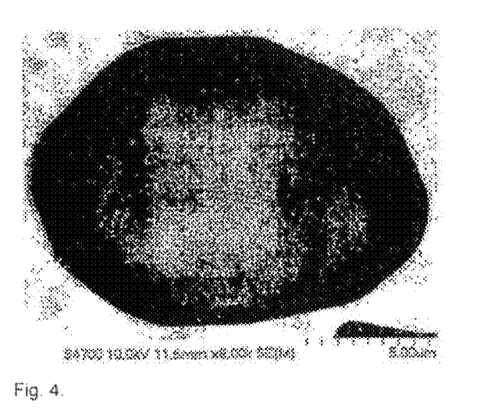
FIG. 4 shows the microphotography of a single grain of X-ray luminescent material used.

We tried a special technique to determinate the possible inclusion of agglomerated grains in the bulk product. The technique involves a volumetric measurement of a particular mass of luminescent material grains. To enhance repeatability, the batch weight of the luminescent material is vibrated in a calibrated cylinder under 5 Hz frequency for 5 minutes. The resulting volume of the X-ray luminescent material powder is a function of the chemical composition, the grain shape and the presence of agglomerates. In accordance with the proposed technique, the specific volume value for the X-ray luminescent material $(Gd_{0.3}Lu_{0.55}Bi_{0.05}Eu_{0.01})_{1.9}O_{1.9}$ $(B,J)_{0.1}(S,Se)_1$ amounted to $\rho$=4.8-4.9 $g/cm^3$. This appears to be a very significant value taking into consideration the estimated theoretical density of the luminescent substance about $\Sigma$=8.3-8.5 $g/cm^3$. This advantage of high bulk density is realized in the proposed detector which features a very high filling density of hetero-phase layers, approximately 40 to 120 $mg/cm^2$.

Thus, the resulting high values of bulk density of the X-ray luminescent material allows for enhancement of the integral light intensity value for the multi-element X-ray imaging detector. Our measurements of the integral light intensity value for the X-ray beam energy 80 keV exceeded 4 $cd/m^2$.

Photodiode Matrix.

The next design element of the novel device are photodiodes, arranged in a matrix with n-lines and m-rows. The values "n" and "m" depend on the size of the examined object. Thus, as we have seen in previous research, n=64 and m=64 are well enough for dentofacial X-ray examination. The matrix of 256*256 elements fully meets the requirements for dentofacial application. The matrix of 256*256 to 512*512 elements are suitable for mammalogy, and 1.024*1024 are sufficient for larger objects. Such matrices are suitable for most X-ray examination of child, patients 10 years old and younger. The largest matrices of 3072*3072 (square) and 2048*4096 (oblong) elements are required in adult patient examinations. These wide-screen matrices provides for a 440*440 mm field of view, which is more than any field provided in the X-ray EOICs (200*200 mm).

In reviewing the invention, we mentioned that photosensitive elements may be manufactured as a matrix utilizing various chemical elements. The first constructions of digital

TABLE 4

| Cationic Sublattice Composition | Anionic Sublattice | Radiation $\Lambda_{max}$, Nm | Energy Efficiency, % | Afterglow Period, Ms | $d_{50}$ |
|---|---|---|---|---|---|
| $Gd_{0.4}Lu_{0.5}Eu_{0.1}$ | O, S | 626,707 | 20 | 3 | 8-9 |
| $Gd_{0.3}Lu_{0.55}Bi_{0.05}Eu_{0.1}$ | O, Br, S | 626,708 | 21.5 | 2.6 | 6-10 |
| $Gd_{0.3}Lu_{0.55}Re_{0.05}Eu_{0.08}Sm_{0.2}$ | O, J, S | 626,708 | 22 | 3.2 | 8-12 |
| $Gd_{0.5}Lu_{0.35}Bi_{0.05}Eu_{0.09}Sm_{0.01}$ | O, J, S, Se, Br | 628,710 | 24.8 | 3.4 | 8-12 |
| $Gd_2O_2S$: Tb | S | 545 | 14-18 | 3 | 6 |

Another feature of the proposed synthesis process is the development of textured grains of rear-earth X-ray luminescent material. One of such grains is shown in the FIG. 4, which implies high uniformity of generated grains along with their high optical transparency and uniaxiality.

To enhance the exterior resistance of the X-ray luminescent material grains, their surface is covered with a thin translucent coating based on zinc silicate. $ZnO.SiO_2$, 40 nm to 100 nm thick. This coating is solid and provides grain protection from matrix X-ray detectors used matrices with elementary selenium Se. This material is easily vacuum evaporated ($T_{evp} \approx 600°$ C.), allowing for the processing of different structures by means of a template deposit evaporation of up to 2000 elements on a single side, preserving high precision. But despite the proven technology, selenium matrices had apparent deficiencies—the integral photosensitivity value was about ones lux per 1 $cm^2$ which required a lot of light emission by the X-ray luminescent material. The low sensitivity of the selenium layer in turn required a high working current in the X-ray tubes (radiation sources), resulting in significant radiation exposure to patients.

An important step forward was made when multi-elemental detectors began to utilize elementary silicon. Initially, while the design implied an optical transfer of image, CCD-matrices were required which featured sensitivity of up to $10^{-4}$ lux per element. Yet, these high values of sensitivity were attainable in monocrystalline silicon elements, making construction economically unsound and technically inappropriate if a large detector was needed.

The development of active matrix liquid crystal displays provided for polycrystalline and even noncrystalline film silicone coatings. Processing and properties of the coatings were different, and these issues are particularly discussed below.

First, we describe the technology of manufacturing the proposed silicon matrix detector using materials of Scint-x (Scintillator technology) company. The process flow comprises six stages:

Stage one—surface oxidation of the primary polycrystalline coating. Oxidation is performed in an oxygen atmosphere and required initiation by gas-discharge oxygen plasma under pressure p=10 mm Hg. $SiO_2$ film generated on the polycrystalline silicone surface is $\delta$=250 nm to $\delta$=1.5 μm.

Stage two—photolithography over polycrystalline silicon. The primary layer of the photoresist is applied over silicon by a centrifuge process. The photoresist obtains photosensitivity during polymerization due to special ingredients.

Applied heating of the photoresist layer makes it thinner. Then, the photoresist layer is exposed to hard ultra-violet and blue radiation through a chromed negative. The areas of the photoresist layer exposed to UV-light are polymerized with the formation of an insoluble coating. The rest of the photoresist is removed from the polycrystalline silicon substrate which bears polymerized areas of photoresist.

The next stage is the opening of the silicon dioxide layer. Usually, this process takes place in an HF atmosphere of under-fluorinated hydrogen halide plasma in special apparatuses.

Gaseous $SiF_4$ generated during the etching of the silicon dioxide is removed, and are opened in the silicon dioxide channels, providing for further direct etching of the silicon.

The next stage is silicon layer etching. It is done either by electrochemical etching or by a deep reactive ion etching (DRIE) method. The surface lattice of the silicon dioxide prevents direct etching of the polycrystalline silicone layer. Thus, the etched channels and the relief areas of the polycrystalline silicone form the required texture of the scintillator detector's photodetectors.

According to Scint-x Company, the next stage is the coating of the formed multi-element silicon matrix with a film of scintillating substance. One of variants of our invention suggests covering the detector matrix directly with a metal grid sheet, fix it over the photodetector matrix, and then cast the multi-element scintillating layer in place. For this technique, we selected the optimum polymer composition for a detector providing for X-ray resistance. The polymer we proposed stands while heating up to T=400° C. without destruction. Another important property of the polymer is its high resistance to different types of penetrating radiation, including X-ray.

The final stage, according to Scint-x Company, is the photosensitive matrix passivation by coating it with a transparent to scintillator radiation layer.

If the image resolution is of prime importance for the device along with a high contrast, then the workflow must be strictly adhered to: initially, the silicon matrix substrate must be produced for optical signal reading, and then, the multi-element layer of the radiation detector must be formed over this substrate. For proper aligning of the silicon photodetectors' centers with the centers of the scintillating X-ray-sensitive detector, a diagonal three-point aligning system is used which implies the positioning of three protruding reference marks on the silicon matrix, which centers are used to position the grid plate of the scintillating detector. The external surface of the grid sheet is coated with a thin translucent film which allows for the fixation and alignment of the photodiode matrix sheet and the matrix scintillating detector sheet. Furthermore, the arranged set is placed onto the cast machine's moving plate, which casts polycarbonate X-ray luminescent material suspension into the grid cells. Thus, the detector obtains the required characteristics of high X-ray sensitivity and image brightness.

The differences are realized in a multi-element detector, which X-ray sensitive layer is formed directly on the silicon photosensitive cells with the grid sheet fixed above so that the optical centers of the photosensitive cells are aligned with the centers of the "live cross-section" of each of the grid cells.

As we have discovered, in high-energy systems, the scintillator (full-depth hetero-phase X-ray luminescent layer detector) is more practical for casting in two or three stages with an intermediate polymerization of each of the casted hetero-phase layer. The suggested polymerization temperature of T=130-140° C. does not affect the consistency of the silicon photodetector matrix. The mass load of a single layer by the X-ray luminescent material is m=20-25 mg/cm$^2$ which is equivalent to the complete absorption of X-ray radiation with an initial energy of E=40 keV. The second cast hetero-phase scintillating layer with a mass load of m=20-25 mg/cm$^2$ results in coating capable of absorbing radiation with an initial energy of E=80 keV. In the third cast layer, the coating thickness is enough for absorption of E=120 keV, which is suitable for major medical and diagnostic applications.

Thus resulting multi-layer silicon and polymer scintillating structure is prepared for testing. This requires cleaning the commutation wiring of the photodiode matrix and collecting them into terminals of many contact wires. The terminals are fixed in the peripheral receptacles.

Initial testing of the device is performed in a Siemens or similar X-ray apparatus under testing radiation energy of E=80 keV. A round template with cells of different sizes is used as a reference.

Figure 5:
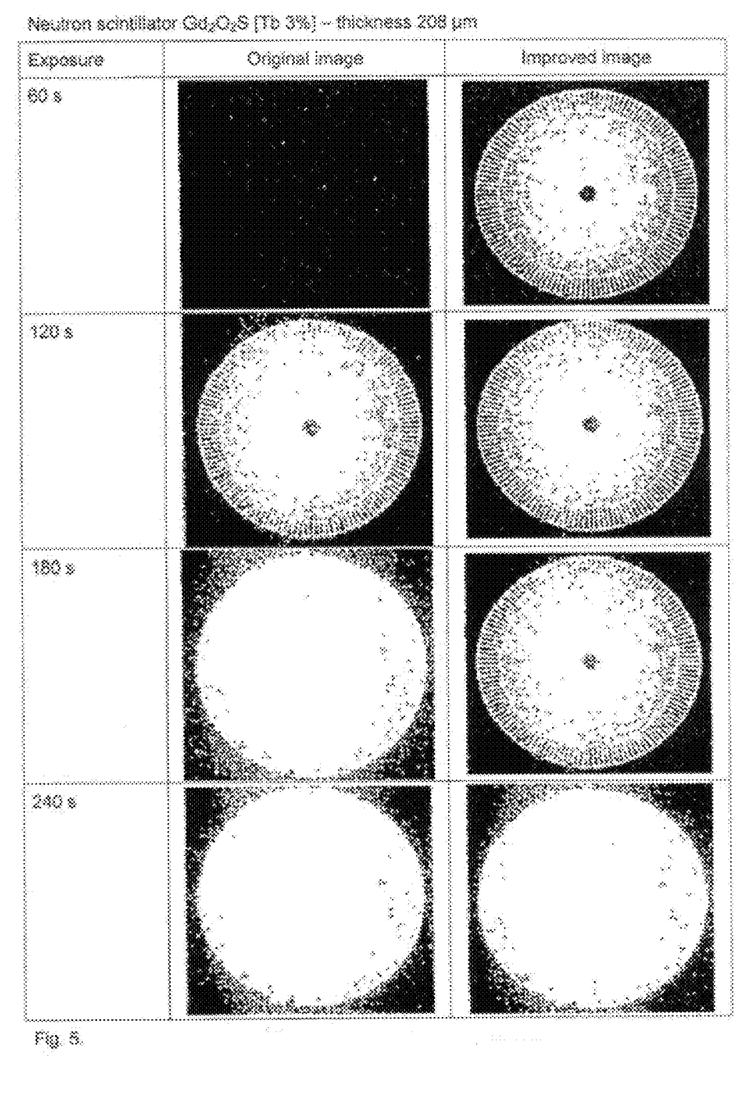
FIG. 5 shows a photo of the screen of the proposed detector.

FIG. 5 shows a photo of the multi-element detector display with a center circle diameter of 120 mm. As it appears from the photo, the resolution power of the construction is far above 4 pairs of lines per 1 millimeter.

The full contrast range is above 50% while improvement of the luminescent material composition, luminescent material thickness, and characteristics of the woven grid sheet results in a virtually complete balancing and reduction of background glowing. This advantage is realized in the proposed multi-element detector featuring imaging contrast in excess of 50% along with resolution power above 4 pairs of lines per 1 millimeter. We have not seen a similar description of imaging quality without ghost glowing in the cited literature.

The development and industrial processing of the proposed detector is a complex, advanced production process which requires high-quality workflow implementation. A production launch of the detectors is planned for 2010.

CITED LITERATURE

1. <<Image forming in roentgenography>>. Under redaction of B. Webb, Moscow, <<Mir>>, V. 1, p. 346 (2000).

2. Tevtor A. Philips Tech. Rev., V. 14, pp. 33-43 (1976).
3. Gurvich A. M., Malova A. M., Soschin N. P. USSR Author. Certificate No 457789 (21 Feb. 1978)
4. Tomas A. et all. J. Electrochem. Soc., V. 118, p. 151 (1971).
5. Gurvich A. M., Soschin N. P. Izvestiya Acad. of Sciences of USSR, ser. Phys., V. 41, p. 1372-1379 (1977).
6. Zhitnik L., Tindo L. SU Pat. No 1569906 (6 Jul. 1990)
7. Well S. The Proc. of Medical Imaging Institute of Phys. Bristol. G. B. (1992).
8. West P. et all. U.S. Pat. No. 5,126,573 (30 Jun. 1992)
9. K. Yokota et all. U.S. Pat. No. 5,302,817 (12 Apr. 1994).
10. Rocha J. G et all. IEEE Trans., V. 6, No 5, p. 7803 (2002).
11. Rocha J. G. 14 European Conf. On Solid-State Transistors, V. 2, p. 27 (2000).
12. Keitchie A. et all. US pat. No 2006/0033030A1 (12 Jul. 2006)
13. Mollov N. US pat. No 2005/028044A11 (26 Jun. 2001)
14. Horotian S. G. U.S. Pat. No. 6,252,231B1 (26 May 2001).
15. Nagarkar V. V. et all. Nuclear Science. IEEE Transaction, V. 50, No 3, p. 297 (2006).
16. Deok Jm. Jung et all. ETRI Journal, V. 30, No 5, p. 747 (2008).
17. Simon M. et all. Medical Phys., V. 35, p. 968-981 (2008).
18. Metallic grids. GOST 6613-86, 2002.

The invention claimed is:

1. A multi-element X-ray detector, including a plate-type multi-element scintillator which transforms X-rays falling onto an external surface of the scintillator into visible light and a photodetector matrix which optically contacts with an emitting surface of the scintillator and transforms optical radiation emitted on the inner surface of the scintillator into an electrical signal; its main feature is that the above-mentioned multi-element scintillator combines a discrete set of hetero-phase luminescent elements positioned in cells of a grid made of X-ray absorbing and light reflecting metal with geometrical dimensions for spacing, cross-section and interconnection thickness for each particular luminescent element, and coincide with the actions of a photodetector matrix; a rear side of the aforesaid metal grid has a reflecting layer, while its front surface has a multi-element semiconductor matrix with element-to-element contact with a luminescent detector; these contacting elements are simultaneously excited by X-ray radiation with energy 30 to 140 keV.

2. The multi-element X-ray detector as per claim 1, wherein the metal grid is made of elements with atomic numbers between N=24 to N=74, where the grid size is 2-4, 20-40 or 40-60 turns per 1 mm.

3. The multi-element X-ray detector as per claim 1, wherein the X-ray-sensitive layer is a multi-elemental mosaic comprised of a layer of X-ray luminescent arranged by cells of a metallic grid made of elements with atomic numbers 24 to 74.

4. The multi-element X-ray detector as per claim 1, wherein its rear surface is coated with a double-layer reflecting film 2000 Å to 6000 Å thick while on the detector there is a layer of metallic silver below 1000' Å thick which is overcoated with a reflecting aluminum layer below 5000 Å thick.

5. The multi-element X-ray detector as per claim 1, wherein the grid turns are galvanically coated with a reflecting silver layer below 2000 Å thick.

6. The multi-element X-ray detector as per claim 1, wherein metal woven, coiled or galvanically deposited grid sheets are used for producing a cellular multi-element structure of the detector's X-ray-sensitive layer featuring above 48% "live cross-section" with more than 3 wires per 1 mm of the grid sheet length.

7. The multi-element X-ray detector as per claim 1, wherein, for metallic grids, woven grid sheets are used made of stainless steel, nickel or bronze with a "live cross-section" below 64.5%, or coiled grid sheets are used made of tungsten wire with a "live cross-section" below 85%.

8. The multi-element X-ray detector as per claim 1, wherein its X-ray sensitive layer is made of a dispersed medium presented by polycarbonate featuring a refractive index n=1.59 to 1.60, which encapsulates the dispersed medium comprised of rear-earth X-ray luminescent grains with a refractive index n=2.2.

9. The multi-element X-ray detector as per claim 1, wherein it utilizes a cast method of production which involves a distribution of liquid suspension of X-ray luminescent in a solution of polymer binder over a surface of a photodetector matrix; this polymer binder is polycarbonate with a molecular mass M=10000-15000 carbon units, dissolved in a low-boiling solvent; a powder X-ray luminescent amounts 20 to 56% of the polymer by mass.

10. The multi-element X-ray detector as per claim 1, wherein its photodetector matrix is made of multiple layers of amorphous or polycrystalline silicone by means of an optical photolithography process and chemical etching.

11. The multi-element X-ray detector as per claim 1, wherein its X-ray-sensitive layer is applied directly onto the photodetector matrix with a metallic grid sheet fixed above so that optical centers of the photodetectors are positioned exactly against the centers of the "live cross-section" of each grid cell.

12. The multi-element X-ray detector as per claim 1, wherein its X-ray-sensitive layer is applied onto a separate plate made of X-ray-penetrable material with a metallic grid sheet fixed above; this grid is attached against the photodetector matrix with its cellular side holding an X-ray luminescent so that optical centers of the photodetectors are positioned exactly against the centers of the "live cross-section" of each grid cell.

13. The multi-element X-ray detector as per claim 1, wherein its contrast ratio is above 50% with a resolution above 4 line pairs per 1 millimeter.

14. Rear-earth X-ray luminophore for the multi-element X-ray detector as per claim 1 with active compounds of rear-earth elements characterized in that its hetero-phase discrete luminescent elements contain monocrystalline microscopic grains of rear-earth luminescent obtained from multiligand oxysulphides of elements such as gadolinium, lutetium, europium, dysprosium, bismuth and rhenium, and, where, in their base, oxygen is partly substituted with halogen, and sulphur is partly substituted with nitrogen, thus having a stoichiometric formula as follows where $\Sigma Me$=Gd and/or Lu and/or Dy and/or Eu and/or Bi and/or Re, $Hal=F^{-1}$ and/or $Cl^{-1}$ and/or $Br^{-1}$ and/or $J^{-1}$, $0.01 < x \leq 0.08$, $0.001 \leq y \leq 0.01$, while the grains of said luminescent are shaped in three-dimensional polygons coated with a disperse phase of polymer binder in a ratio 20 to 65%.

15. Production method for X-ray luminophore as per claim 14 for multi-element X-ray detector through the method of codeposition of rear-earth compositions with subsequent heat treatment in a molten compounded of rear-earth ions and d-shell ions characterized in that the synthesis is in two stages; the first stage produces oxyhalides of cationic subgroup elements through a reaction between the originally codeposited oxides of rear-earth elements, Bi and Re, and ammonium halides under a temperature of T=400° C. to T=700° C. for 1 to 4 hours with secondary heat treatment in molten chalcogenides where the molecular ratio is 1:1 to 1:3 under a temperature of T=800° C. to T=1200° C. for 2 to 8 hours with subsequent leaching of the finished product with water or mineral acid solutions.

* * * * *

UNITED STATES PATENT AND TRADEMARK OFFICE
CERTIFICATE OF CORRECTION

| | | |
|---|---|---|
| PATENT NO. | : 8,445,856 B2 | Page 1 of 1 |
| APPLICATION NO. | : 13/390323 | |
| DATED | : May 21, 2013 | |
| INVENTOR(S) | : Vladimir Nikolaevich Ulasyuk et al. | |

It is certified that error appears in the above-identified patent and that said Letters Patent is hereby corrected as shown below:

Title page item (54) and in the Specification, Column 1

The title should read—

MULTI-ELEMENT X-RAY DETECTOR, ITS RARE-EARTH LUMINESCENT MATERIALS, PRODUCTION OF MULTI-ELEMENT SCINTILLATOR AND DETECTOR IN GENERAL

Signed and Sealed this
Twenty-sixth Day of August, 2014

Michelle K. Lee
*Deputy Director of the United States Patent and Trademark Office*